(12) United States Patent
Zuidervaart et al.

(10) Patent No.: US 11,672,375 B2
(45) Date of Patent: Jun. 13, 2023

(54) COFFEE BREWING

(71) Applicant: KONINKLIJKE PHILIPS N.V., Eindhoven (NL)

(72) Inventors: Jasper Zuidervaart, Eindhoven (NL); Mart Kornelis-Jan Te Velde, Eindhoven (NL); Johannes Marra, Eindhoven (NL); Anna Louise Wijnoltz, Eindhoven (NL); Nicole Petronella Martien Haex, Eindhoven (NL); Nicolaas Petrus Willard, Eindhoven (NL); Pieter Musters, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 664 days.

(21) Appl. No.: 16/474,323

(22) PCT Filed: Dec. 28, 2017

(86) PCT No.: PCT/EP2017/084691
§ 371 (c)(1),
(2) Date: Jun. 27, 2019

(87) PCT Pub. No.: WO2018/122291
PCT Pub. Date: Jul. 5, 2018

(65) Prior Publication Data
US 2019/0335944 A1 Nov. 7, 2019

(30) Foreign Application Priority Data

Dec. 29, 2016 (EP) .................................... 16207417

(51) Int. Cl.
*A23F 5/16* (2006.01)
*A47J 31/42* (2006.01)
(Continued)

(52) U.S. Cl.
CPC ........... *A47J 31/52* (2013.01); *A47J 31/3609* (2013.01); *A47J 31/3676* (2013.01); *A47J 31/42* (2013.01)

(58) Field of Classification Search
CPC ............ A23V 2002/00; A23V 2200/16; A23V 2250/21; A23V 2250/2108;
(Continued)

(56) References Cited

U.S. PATENT DOCUMENTS

2004/0253356 A1 12/2004 Fields
2008/0038441 A1 2/2008 Kirschner
(Continued)

FOREIGN PATENT DOCUMENTS

CA 2209396 A1 1/1998
CN 1382019 A 11/2002
(Continued)

OTHER PUBLICATIONS

Zhiqiu, X., et al., "Coffee and Tumor", Giston, pp. 109-113, Mar. 31, 2012.
(Continued)

*Primary Examiner* — Hong T Yoo
(74) *Attorney, Agent, or Firm* — Schott, P.C.

(57) ABSTRACT

A method and apparatus provides a coffee beverage having a reduced terpene content, in which terpene content is reduced by increasing the particle size of the coffee grounds.

6 Claims, 4 Drawing Sheets

(51) Int. Cl.
*A47J 31/52* (2006.01)
*A47J 31/36* (2006.01)

(58) Field of Classification Search
CPC ..... A23V 2300/14; A23L 33/105; A23L 2/56;
A23L 5/00; A23F 5/24; A23F 5/10; A23F
5/16; A23F 5/26; A23F 5/262; A23F
5/08; A47J 31/0657; A47J 31/0652; A47J
31/0068; A47J 31/3609; A47J 31/3676;
A47J 31/42; A47J 31/06
See application file for complete search history.

(56) References Cited

U.S. PATENT DOCUMENTS

| | | | |
|---|---|---|---|
| 2009/0205502 A1* | 8/2009 | Carbonini | A47J 31/5251 99/280 |
| 2018/0206514 A1* | 7/2018 | Birch | A23F 5/483 |

FOREIGN PATENT DOCUMENTS

| | | | | |
|---|---|---|---|---|
| CN | 101778587 A | 7/2010 | | |
| CN | 102988533 A | 3/2013 | | |
| CN | 103781364 A | 5/2014 | | |
| EP | 0247999 A2 | 12/1987 | | |
| EP | 1129623 A1 | 9/2001 | | |
| FR | 2499369 A1 | 8/1982 | | |
| WO | 2013019676 A2 | 2/2013 | | |
| WO | WO-2015197340 A1 * | 12/2015 | ............... | A23F 5/12 |
| WO | 2016/132412 A1 | 8/2016 | | |

OTHER PUBLICATIONS

Turcanu, A., et al., "Implementation of the Automaticaly Adjustable Tamping Process in the Automated Coffee Brewing", International Conference on Applied and Theoretical Electricity (ICATE), pp. 1-6, Nov. 24, 2016.

\* cited by examiner

COFFEE BREWING

CROSS-REFERENCE TO RELATED APPLICATION

This application is a U.S. National Phase application under 35 U.S.C. § 371 of International Application No. PCT/EP2017/084691, filed on Dec. 28, 2017, which claims the benefit of International Application No. 16207417.3 filed on Dec. 29, 2016. These applications are hereby incorporated by reference herein.

FIELD OF THE INVENTION

The invention relates to reducing the amount of terpenes in a coffee beverage, in particular reducing the amount of diterpenes such as cafestol and/or kahweol. This invention also relates to a method for providing a coffee beverage having a reduced terpene content and an apparatus for providing a coffee beverage having a reduced terpene content.

BACKGROUND OF THE INVENTION

Terpenes, particularly diterpenes such as cafestol and/or kahweol are found in the lipid fraction of coffee beans. Though these compounds have been associated with providing some possible health benefits they have also been associated with increasing the levels of low density cholesterol (so-called "bad cholesterol" or LDL cholesterol) in coffee drinkers. Increasing levels of LDL cholesterol is linked to increased risk of cardiovascular diseases. Different types of coffee contain cafestol and kahweol to varying extents. Cafestol and kahweol are generally only present in at most minimal amounts in filter coffee due to the low pressures involved and also because they are absorbed in filter paper. However, in non-filter coffees such as espressos, French press coffee and Turkish coffee they are present in significantly greater amounts. Cafestol in particular has been found to be a potent cholesterol-elevating compound. US 2008/0038441 A1 relates to a low-cholesterol brewed beverage dispenser which uses a filter to remove high cholesterol oils from a brewed beverage.

Hence there is a need for methods and associated apparatus for controlling or decreasing the amounts of kahweol and/or cafestol in coffee and preferably without impacting adversely on the intensity and/or taste and the cost associated with preparing coffee. For example, it would be preferable to obtain healthier coffee without having to resort to chemical means for decreasing the amounts of cafestol and kahweol in coffee.

SUMMARY OF THE INVENTION

It is an object of the present invention to provide a coffee beverage produced from coffee grounds, the resulting coffee beverage having a reduced terpene content, in particular a reduced diterpene (such as cafestol and/or kahweol) content.

The present invention is based on the surprising finding that the amounts of terpenes in a coffee beverage, in particular diterpenes such as cafestol and/or kahweol may be reduced by providing a ground coffee with an increased or larger particle size, i.e. coarser ground coffee. Further, any impact on the intensity/taste may be ameliorated by increasing the volume of coffee grounds used to prepare the coffee beverage.

The present invention provides a method of reducing the terpene content in a coffee beverage by increasing the particle size of the coffee grounds.

The present invention also provides an apparatus for providing a coffee beverage having a reduced terpene content and an apparatus which allows a user to select the terpene content of a coffee beverage.

According to a first aspect of the invention, there is provided a method for producing a coffee beverage having a desired terpene content. The method may comprise:
  selecting a desired terpene content;
  selecting coffee grounds having a particle size based on the desired terpene content;
  providing the coffee grounds having the selected particle size to a brew chamber; and
  providing a volume of heated and pressurised water to flow through the coffee grounds in the brew chamber and out of the brew chamber to provide a coffee beverage.

In a second aspect, there is provided a method of providing a coffee beverage having a reduced terpene content, the method comprising:
  providing a brew chamber comprising coffee grounds having a surface weighted average particle size of about 20.5 µm or greater;
  providing a volume of heated and pressurised water to flow through the coffee grounds in the brew chamber and out of the brew chamber to provide a coffee beverage.

In a third aspect, there is provided a coffee beverage producing apparatus. The apparatus may comprise:
  a brewing unit configured to brew coffee grounds to provide a coffee beverage;
  a coffee grounds supply unit for supplying coffee grounds to the brewing unit;
  a user control to allow a user to select a coffee beverage having a desired terpene content; and
  a coffee grounds selector unit coupled to the user control for controlling the particle size of coffee grounds supplied to the brewing unit from the coffee grounds supply unit based on the desired terpene content of the coffee beverage selected by the user.

In a fourth aspect, there is provided a coffee beverage producing apparatus for providing a coffee beverage having a reduced terpene content. The apparatus may comprise:
  a pressurisable brewing unit configured to brew coffee grounds to provide a coffee beverage; and
  a coffee grounds supply unit configured to supply coffee grounds having a surface weighted average particle size of about 20.5 µm or greater to the brewing unit.

In a fifth aspect, there is provided an espresso capsule, espresso pod or espresso pad for providing a coffee beverage having a reduced terpene content, the espresso capsule, espresso pod or espresso pad comprising coffee grounds having a surface weighted average particle size of greater than about 20.5 µm. In certain embodiments the coffee beverage has a Brix value of greater than about 2%.

In a sixth aspect, there is provided a use of coffee grounds having a surface weighted average particle size of about 20.5 µm or greater for producing a coffee beverage having a reduced terpene content. In certain embodiments the coffee beverage has a Brix value of greater than about 2%.

An advantage of the method and associated apparatus according to the present invention is that lower levels of terpenes, in particular diterpenes such as cafestol and kahweol, are present in the coffee beverage prepared from coffee grounds without adversely impacting on the taste of the coffee beverage and in a manner which is convenient for the user. The objectives of the invention are achieved without, for example, having to resort to the use of additional chemicals.

The term "terpenes" refers to a class of organic compounds produced by plants. The term "terpenes" used herein is used to refer to free terpenes and terpene esters, for example free diterpenes and diterpene esters. Likewise, the term "diterpenes" is used to refer to free diterpenes and diterpene esters. The terms "cafestol", "kahweol" and "16-O-methylcafestol" are also used to refer to their free diterpenes and esters. Diterpenes include compounds such as cafestol, kahweol and 16-O-methylcafestol the structures of which are shown below where R is H (e.g. the compound may be referred as a "free terpene") or a fatty acid (e.g. the compound may be referred as a "terpene ester"), such as palmitate.

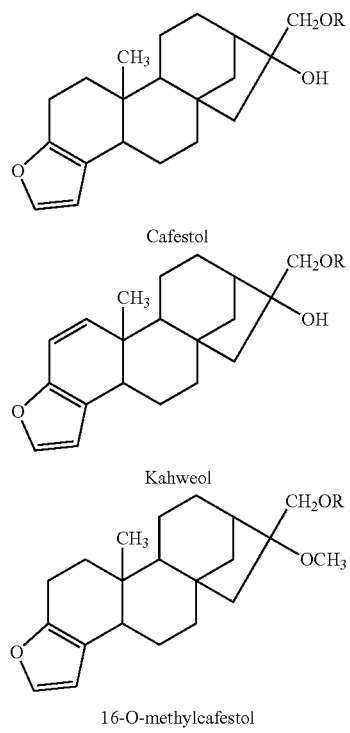

The method and apparatus described herein provide a coffee beverage having a reduced terpene content. In certain embodiments, the terpene content is the diterpene content of the coffee beverage, for example the cafestol, kahweol and 16-O-methylcafestol content of the coffee beverage. In certain embodiments, the terpene content is the cafestol and/or kahweol content of the coffee beverage. In certain embodiments the terpene content is the cafestol content of the coffee beverage. In certain embodiments the terpene content is the kahweol content of the coffee beverage.

In certain embodiments, a "reduced terpene content" refers to a reduction in terpene concentration compared to a coffee beverage produced with coffee grounds having a smaller particle size under the same brewing conditions (e.g. coffee bean species, amount of coffee grounds, brewing time, water volume, brewing temperature, pressure in the brewing chamber and water flow rate). In certain embodiments, a "reduced terpene content" may be a terpene content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, or about 4 mg/l or less.

In certain embodiments, a "reduced terpene content" may be a diterpene content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, or about 4 mg/l or less.

In certain embodiments, a "reduced terpene content" may be a combined cafestol and kahweol content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, or about 4 mg/l or less.

In certain embodiments, a "reduced terpene content" may be a cafestol content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, about 4 mg/l or less, about 3 mg/l or less, or about 2 mg/l or less.

In certain embodiments, a "reduced terpene content" may be a kahweol content of about 60 mg/l or less, for example about 50 mg/l or less, about 45 mg/l or less, about 40 mg/l or less, about 35 mg/l or less, about 30 mg/l or less, about 25 mg/l or less, about 20 mg/l or less, about 15 mg/l or less, about 10 mg/l or less, about 8 mg/l or less, about 6 mg/l or less, about 5 mg/l or less, about 4 mg/l or less, about 3 mg/l or less, or about 2 mg/l or less.

The terpene or diterpene content of a coffee beverage may be determined by HPLC analysis as described in the examples in relation to cafestol and kaweol content.

In certain embodiments, the present invention involves selecting a desired terpene content for a coffee beverage and selecting coffee grounds having a particle size based on the desired terpene content. For example, the present inventors have found that increasing the particle size of the coffee grounds decreases the terpene content in a coffee beverage produced. Therefore, an increased particle size of the coffee grounds will be selected as the selected terpene content is reduced.

The particle size of the coffee grounds referred to herein may be the surface weighted average particle size of the coffee particles. The surface weighted average particle size may be determined by methods known by the skilled person, such as using an optical particle size analyser (e.g. M Mastersizer 2000; Malvern Instruments Ltd, UK). An optical particle size analyser may be used to measure the size of particles in a dry-dispersed state (e.g. using compressed air) or in a wet-dispersed state (e.g. using ultra-sonication in a liquid, such as water). In order to determine the average particle size of coffee grounds, the laser diffraction data obtained using an optical particle size analyser may be interpreted using the optical constants n=1.53 (refractive index of coffee grounds) and k=0.1 (particle absorption index, in fact the obtained results were found to be fairly insensitive to the k value throughout the range 0.1<k<1).

The particle size of coffee grounds conventionally used to produce espresso coffee is typically less than about 20 μm.

For example, the surface weighted average particle size of Illy® pre-ground espresso coffee has been measured to be 19.7 μm.

In certain embodiments, the surface weighted average particle size of coffee grounds, for example used to produce a coffee beverage under conditions of elevated pressure (e.g. a pressure above atmospheric pressure, for example a pressure of greater than about 3 bar), for example an espresso coffee (e.g. a coffee beverage having a Brix value of greater than 2%), may be greater than about 20 μm, for example about 20.5 μm or greater, about 21 μm or greater, about 21.5 μm or greater, about 22 μm or greater, about 22.5 μm or greater, about 23 μm or greater, about 23.5 μm or greater, about 24 μm or greater, about 24.5 μm or greater, about 25 μm or greater, about 25.5 μm or greater, about 26 μm or greater, about 26.5 μm or greater, about 27 μm or greater, about 27.5 μm or greater, about 28 μm or greater, about 28.5 μm or greater, about 29 μm or greater, or about 30 μm or greater. In certain embodiments, the surface weighted average particle size of coffee grounds, for example used to produce a coffee beverage under conditions of elevated pressure, is up to about 50 μm, for example up to about 45 μm, for example up to about 40 μm. In certain embodiments, the surface weighted average particle size of coffee grounds, for example used to produce a coffee beverage under conditions of elevated pressure, is in the range of about 20.5 μm to about 50 rpm, for example about 20.5 μm to about 40 μm, or about 21 μm to about 40 μm.

In certain examples, providing coffee grounds having a selected particle size involves grinding coffee beans to produce coffee grounds having the selected particle size. The apparatus may comprise a coffee grounds supply unit for supplying coffee grounds to the brewing unit. The coffee grounds supply unit may be configured to supply coffee grounds having a selected or pre-determined particle size to the brewing unit. The coffee grounds supply unit may comprise a coffee grinding unit for grinding coffee beans to produce coffee grounds having the selected or pre-determined particle size.

In certain examples the apparatus may comprise a coffee grounds selector unit for controlling the particle size of coffee grounds supplied to the brewing unit from the coffee grounds supply unit. For example, a coffee grounds selector unit coupled to a user control, e.g. to allow a user to select a coffee beverage having a desired terpene content, for controlling the particle size of coffee grounds supplied to the brewing unit from the coffee grounds supply unit based on the desired terpene content of the coffee beverage selected by the user. In certain embodiments the coffee grounds supply unit comprises a grinding unit which is adjustable to provide coffee grounds having the selected particle size.

In certain embodiments, the coffee grounds selector unit is configured to select the amount of coffee grounds to be supplied to the brewing unit based on the selected particle size of the coffee grounds. In certain embodiments, the coffee grounds supply unit comprises a coffee grounds dosing unit configured to provide the selected amount of coffee grounds to the brewing unit, for example the amount of coffee grounds selected by the coffee grounds selector unit based on the selected particle size of the coffee grounds.

In certain embodiments, the apparatus comprises a control board for communicating user input from the user control to the coffee grounds selector unit. In certain embodiments, the method comprises communicating a user input from the user control to the coffee grounds selector unit via a control board.

In certain embodiments, the apparatus comprises a user control to allow a user to select a coffee beverage having a desired terpene level. The user control may be coupled to the coffee grounds selector unit to control the particle size of coffee grounds supplied to the brewing unit from the coffee grounds supply unit based on the desired terpene content of the coffee beverage selected by the user. In certain embodiments user inputs to the user control are communicated to the coffee grounds selector unit such that the coffee grounds selector unit controls the particle size of the coffee grounds, for example by adjusting the grinding unit to produce coffee grounds of the selected particle size. In certain embodiments user inputs to the user control are communicated to the coffee grounds selector unit such that the coffee grounds selector unit controls the amount of coffee grounds supplied to the brewing unit based on the selected particle size of the coffee grounds, for example by adjusting the dosing unit of the coffee grounds selector unit.

The user control may comprise a display unit for displaying information indicative of user inputs to the user control. In certain embodiments the user control allows a user to select a desired terpene level of a coffee beverage. In certain embodiments the display unit may show the selected terpene level. However, the user control and/or display unit may not specifically state terpene levels to be selected or that are selected. For example, the user control and/or display unit may allow the user to select a coffee beverage with a particular healthiness level, or for example a coffee beverage associated with lower cholesterol, where the selection is correlated to a desired terpene level.

As used herein, the term "desired terpene level" is used to generally refer to the amount of terpene contained in the coffee beverage provided. For example, selecting a terpene level may refer to selecting a range for the terpene content of the coffee beverage to be produced. For example, the user control may allow a user to select a low, medium or high terpene content, where the low, medium or high terpene content correlates to different terpene content ranges of a coffee beverage.

In certain embodiments, the apparatus comprises a processor element coupled to the user control for controlling operation of the apparatus, for example, for controlling the terpene level and/or coffee beverage intensity and/or taste of the coffee beverage produced by the apparatus. In certain embodiments, the processor comprises a look up table to select the coffee grounds particle size based on the terpene level selected by the user via the user control. In certain embodiments, the processor comprises a look up table to select the amount of coffee grounds supplied to the brewing unit and/or the amount of water supplied to flow through the coffee grounds in the brewing unit. In certain embodiments, the processor comprises a look up table to select the coffee grounds particle size based on the terpene level selected by the user via the user control and also to select the amount of coffee grounds provided to the brewing unit based on the selected particle size, for example, in order to provide a pre-determined coffee beverage intensity and/or taste.

In certain embodiments, the coffee beverage described herein may be a coffee beverage other than a filter coffee, for example the coffee beverage may be produced without using a filter, e.g. a filter paper. In certain embodiments the coffee beverage may be an espresso, French press coffee or Turkish coffee. In certain embodiments, the coffee beverage may be an espresso, for example a single shot of espresso.

In certain embodiments the coffee beverage has a Brix value of at least about 1.5%. In certain embodiments, the coffee beverage has a Brix value of at least about 2%, for example about at least about 2.1%, at least about 2.2%, at least about 2.3%, or at least about 2.4% or greater. In certain embodiments, the coffee beverage has a Brix value of about 2.5% or greater, about 2.6% or greater, about 2.7% or greater, about 2.8% or greater, about 2.9% or greater, about 3% or greater, about 3.1% or greater, about 3.2% or greater, about 3.3% or greater, about 3.4% or greater, about 3.5% or greater, about 3.6% or greater, about 3.7% or greater, about 3.8% or greater, about 3.9% or greater, or about 4% or greater. The Brix value may be as determined using a refractometer.

In certain embodiments, the coffee beverage has a Brix value of about 1.5% to about 8%, for example about 1.5% to about 6%, about 2% to about 6%, or about 4% to about 6%.

The Brix value of a coffee beverage may be measured using a refractometer (for example a digital hand-held 'pocket' refractometer such as Atago® 3830 PAL-3 Full Range Digital Hand-Held Pocket Refractometer). A 1% Brix value of a coffee beverage, for example a coffee beverage provided as described herein, has been found to correspond with an extracted soluble mass concentration of 8.25 mg/ml. The Brix value is used as an indication of the strength of a coffee beverage since it has a clear relation to the dissolved solids in coffee.

Referred to herein are capsules, pods and pads comprising coffee grounds. Coffee ground containing capsules, pods and pads are known to the skilled person as referring to various coffee ground containing vessels which may be inserted directly into a coffee beverage producing machine. The coffee grounds are maintained within the capsule, pod or pad during brewing and therefore the capsule, pod or pad may be used to provide a pre-determined amount of coffee grounds having a pre-determined particle size to provide a coffee beverage having a pre-determined terpene content. Espresso capsules, espresso pods and espresso pads are capsules, pods and pads for providing an espresso coffee beverage, for example a coffee beverage having a Brix value of greater than about 2%.

Brewing Conditions

Producing a coffee beverage may involve determining various brewing conditions, suitable brewing conditions to provide particular coffee beverages, e.g. espresso, are known to the skilled person. As discussed above, the present inventors have found that the terpene content of a coffee beverage produced under pre-determined brewing conditions can be reduced by increasing the particle size of the coffee grounds.

A coffee beverage may be produced in a brewing unit, for example in a brewing chamber within a brewing unit, by providing a volume of water to flow through the coffee grounds in the brew chamber and out of the brew chamber to provide a coffee beverage. In certain embodiments, the volume of water provided to the brew chamber to produce a coffee beverage is less than about 150 ml, for example less than about 100 ml, or less than about 80 ml. In certain embodiments, the volume of water provided to the brew chamber is in the range of about 20 to about 90 ml, for example about 30 to about 80 ml, or about 40 to about 60 ml.

In certain embodiments, a coffee beverage producing apparatus comprises a water supply unit for supplying a volume of water, for example heated and pressurised water, to the brew chamber of the brewing unit. In certain embodiments, the water supply unit is configured to supply a volume of water to flow through coffee grounds in the brew chamber and out of the brew chamber to provide a coffee beverage. In certain embodiments, the water supply unit is configured to supply less than about 150 ml water to the brew chamber to produce a coffee beverage, for example less than about 100 ml, or less than about 80 ml. In certain embodiments, the water supply unit is configured to supply about 20 to about 90 ml water to the brew chamber to produce a coffee beverage, for example about 30 to about 80 ml, or about 40 to about 60 ml.

In certain embodiments, the volume of water which is provided to the brew chamber to flow through the coffee grounds in the brew chamber to produce a coffee beverage refers to the volume of water that flows to and out of the coffee grounds held in the brew chamber, i.e. the total volume of water supplied from a water supply unit may be greater than the volume of water supplied to flow through the coffee grounds due to a "dead volume" of water contained in a water pipe between the water supply unit and the brew chamber, and also due to water that is introduced to the coffee grounds, but does not leave the coffee grounds. In certain embodiments, the volume of water which is provided to the brew chamber to flow through the coffee grounds can be taken to be the final volume of the coffee beverage produced by the method or apparatus described herein.

In certain embodiments, the volume of water provided to the brew chamber to flow through the coffee grounds in the brew chamber to produce a coffee beverage is less than about 150 ml, for example about 100 ml or less, about 80 ml or less, or about 60 ml or less. In certain embodiments, the volume of water provided to the brew chamber is in the range of about 20 to about 150 ml, for example about 20 to about 100 ml, about 20 to about 90 ml, about 20 to about 80 ml, or about 30 to about 60 ml.

In certain embodiments, the total volume of water supplied to the brew chamber (for example including a "dead volume" of water contained in a water pipe between a water supply unit and the brew chamber, and also a volume of water that is introduced to the coffee grounds, but does not leave the coffee grounds) is less than about 150 ml, for example about 100 ml or less, or about 80 ml or less. In certain embodiments, the total volume of water supplied to the brew chamber is about 40 to about 150 ml, for example about 40 to about 100 ml, or about 40 to about 80 ml.

In certain embodiments the time taken for the volume of water to flow through the coffee grounds is less than about 35 seconds, for example less than about 30 seconds. In certain embodiments the time taken for the volume of water to flow through the coffee grounds is in the range of about 15 and about 35 seconds, for example between about 20 and about 30 seconds. The time taken for the volume of water to flow through the coffee grounds in the brew chamber, for example through the coffee grounds and out of the brew chamber, may be referred to as the brew time. For example, the time taken for water to flow through coffee grounds in the brew chamber is the time from when the water first contacts the coffee grounds to the time the last drop of water leaves the coffee grounds to exit the brew chamber. In certain embodiments, the time may be taken to be the time for which a pressure of at least about 3 bar is applied to the brew chamber, for example a time for which a pump supplying pressurised water to the brew chamber is switched on.

In certain embodiments, providing a flow of water through the coffee grounds comprises flowing water at a flowrate in the range of about 1 to 4 ml/s, for example about 1.5 to about 3.5 ml/s, or about 2 to about 3 ml/s through the coffee grounds.

In certain embodiments, the water supply unit is configured to supply a volume of water to the coffee grounds in the brew chamber/brewing unit. In certain embodiments, providing a flow of water to the coffee grounds in the brew chamber/brewing unit comprises flowing water at a flowrate in the range of about 1 to 4 ml/s, for example about 1.5 to about 3.5 ml/s, or about 2 to about 3 ml/s from the water supply unit to the coffee grounds in the brew chamber/brewing unit.

In certain embodiments, the method comprises pressurising the brew chamber, optionally pressurising the brew chamber to a pressure of at least about 3 bar, for example at least about 4 bar. In certain embodiments, the brew chamber is pressurised to a pressure in the range of about 3 to about 10 bar, for example a pressure in the range of about 3 to about 8 bar or in the range of about 4 to about 6 bar, or 4 to about 5 bar.

In certain embodiments the apparatus comprises a brew chamber pressurising unit, optionally configured to apply a pressure of at least about 3 bar, for example at least about 4 bar to the brew chamber. In certain embodiments, the apparatus comprises a brew chamber pressurising unit configured to apply a pressure to water flowing through the brew chamber in the range of about 3 to about 8 bar to the brew chamber, for example about 4 to about 6 bar, or about 4 to about 5 bar to the brew chamber.

In certain embodiments, water having a temperature in the range of about 84 to about 96° C. is provided to the brew chamber.

In certain embodiments, the water supply unit comprises a heating unit to heat water to a temperature in the range of about 84 to about 96° C.

In certain embodiments the amount of coffee grounds provided to or contained in the brew chamber is at least about 5 g, for example at least about 6 g. In certain embodiments, the amount of coffee grounds provided to or contained in the brew chamber is up to about 12 g, for example up to about 11 g, or up to about 10 g. In certain embodiments, the amount of coffee grounds provided to or contained in the brew chamber is in the range of about 5 to about 12 grams, for example about 5 to about 10 g, or about 6 to about 10 g.

It is noted that the invention relates to all possible combinations of features recited in the claims. In particular, features referred to herein in relation to a method apply equally to the apparatus, use, capsules, pods or pads referred to herein unless stated otherwise. Likewise, features referred to herein in relation to an apparatus apply equally to the method described herein.

BRIEF DESCRIPTION OF THE DRAWINGS

Aspects of the present invention will now be described in more detail, with reference to the appended drawings showing embodiment(s) of the invention.

DETAILED DESCRIPTION OF THE EMBODIMENTS

Figure 1:
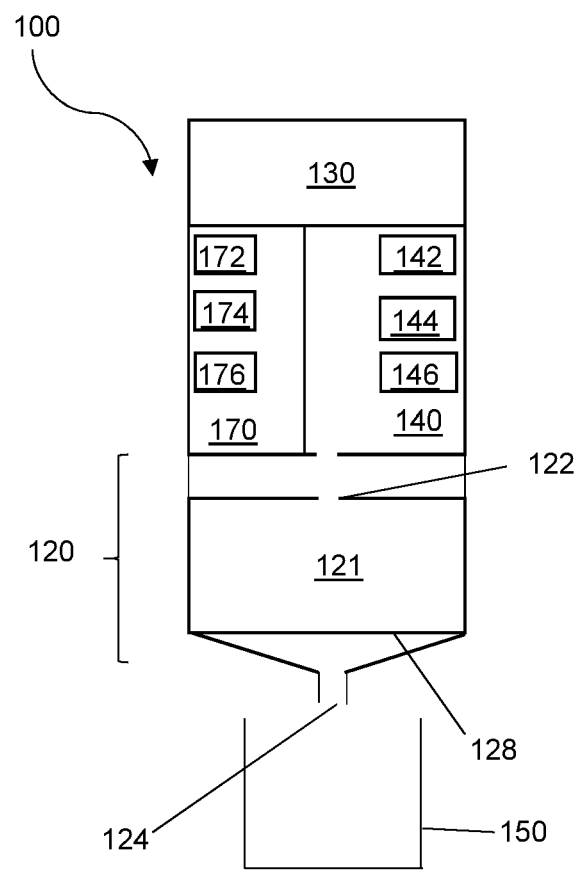
FIG. 1 shows a schematic diagram of a coffee beverage producing apparatus according to the present invention.

The present invention will now be described with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference numerals in the drawings refer to like elements throughout.

Figure 2:
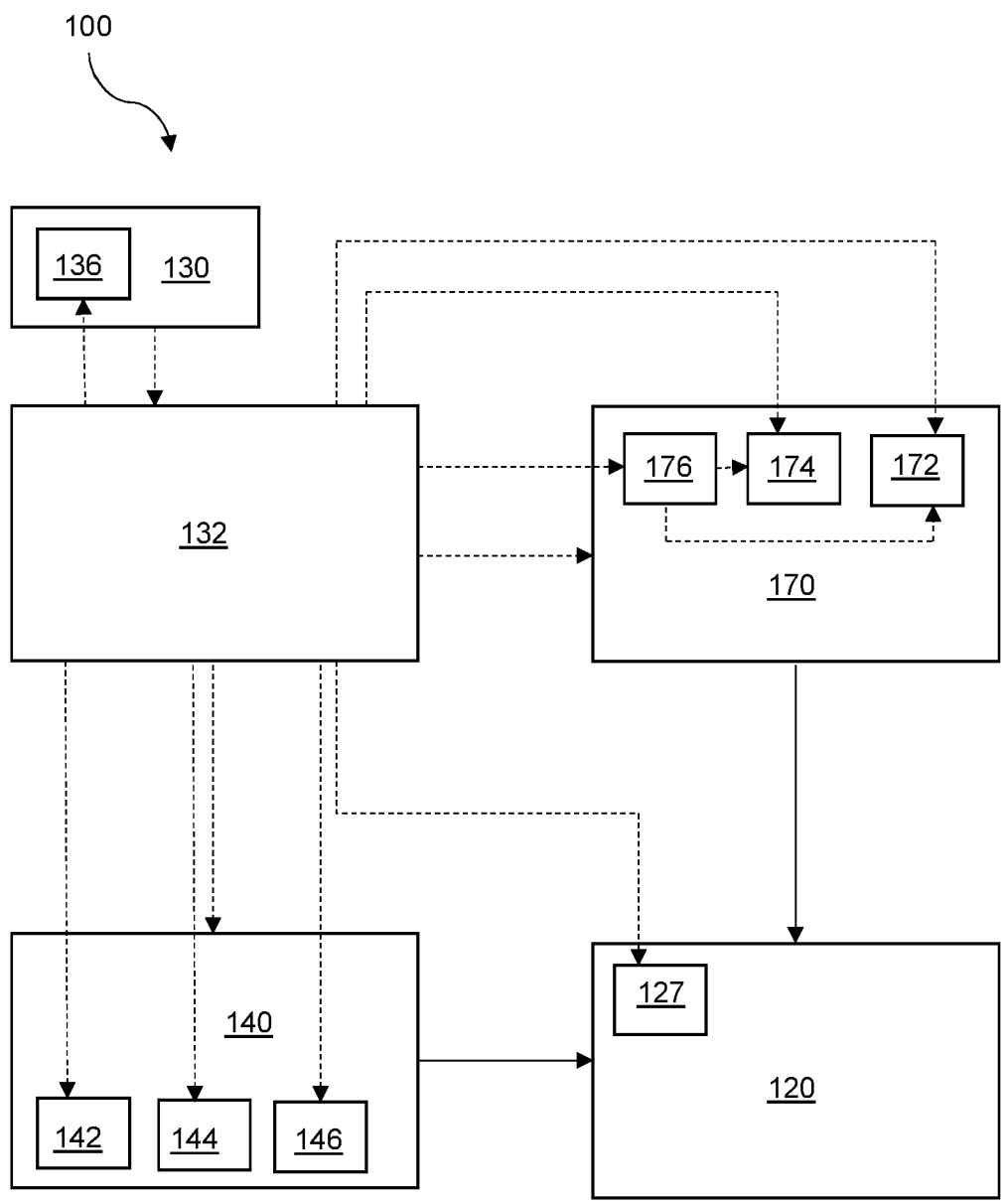
FIG. 2 shows a functional block diagram to illustrate the method and apparatus of the present invention.

FIG. 1 shows a schematic diagram of a coffee beverage producing apparatus according to the present invention. FIG. 2 shows a functional block diagram to illustrate the method and apparatus of the present invention.

FIGS. 1 and 2 illustrate embodiments of the methods and apparatuses described herein for producing a coffee beverage having a reduced terpene content. The apparatus 100 comprises a brewing unit 120 comprising a brew chamber 121 for holding coffee grounds to be brewed to produce a coffee beverage. Coffee grounds are held in the brew chamber 121 during brewing. The brew chamber 121 has an inlet 122 for receiving a volume of water and an outlet 124 through which a coffee beverage produced in the brew chamber exits the brew chamber and the brewing unit 120.

In certain embodiments, the brew chamber 121 comprises a platform 128 on which coffee grounds may be supported during brewing. The platform 128 is configured to allow water to flow from the inlet 122 of the brew chamber to the outlet 124 of the brew chamber, for example the platform 128 may be a perforated platform, without allowing coffee grounds to pass through the platform 128. For example, perforations in the platform may have a size which is less than the particle size of the coffee grounds supplied to the brew chamber 121.

During use, a coffee beverage container 150 may be positioned below the brewing unit 120, for example below the brew chamber outlet 124 to collect the coffee beverage.

The apparatus 100 may comprise a water supply unit 140 for supplying a volume of water to the brewing unit 120. The water supply unit 140 may comprise a water supply dosing unit 142 for supplying a pre-determined volume of water to the brewing unit 120. In certain embodiments, for example for the provision of an espresso coffee beverage, the water dosing supply unit 142 may supply less than about 150 ml water to the brewing unit 120, for example about 30 to about 80 ml of water. In certain embodiments, the water supply unit 140 comprises a water heater unit 144 for heating water before a volume of water is provided to the brew chamber/brewing unit. Water may be heated by the water heater unit 144 to a temperature in the range of about 84 to about 96° C., or heated such that water supplied to the brew chamber 121 has a temperature in the range of about 84 to about 96° C. In certain embodiments, the water supply unit 140 is configured to provide a volume of water flowing through the coffee grounds in the brew chamber 120 at a flowrate in the range of about 2 ml/s to about 3 ml/s. In certain embodiments, the water supply unit 140 comprises a pressurising unit 146 for pressurising water to be supplied to the brewing unit 120. In certain embodiments the pressurising unit 146 is configured to pressurise water, for example water to be supplied to the brewing unit 120 and/or water flowing through the brew chamber 121 to a pressure in the range of about 3 to about 5.5 bar, optionally in the range of about 4 to 5 bar. Pressures in these ranges are suitable for providing an espresso coffee beverage. In certain embodiments, the pressurising unit 146 pressurises water supplied to the brewing unit 120 such that a water having a flowrate in the range of about 2 ml/s to about 3 ml/s is flowed through the coffee grounds in the brew chamber 121.

The apparatus 100 may comprise a coffee grounds supply unit 170 for supplying coffee grounds to the brewing unit 120. The coffee grounds supply unit 170 may comprise a coffee grounds dosing unit 172 for supplying a pre-determined or selected amount of coffee grounds to the brewing unit 120. The coffee grounds supply unit may comprise a coffee bean grinding unit 174 for grinding coffee beans to produce coffee grounds for supply to the brewing unit 120.

The apparatus 100 may comprise a tamping unit 127, for example the brewing unit 120 may comprise the tamping unit 127, for providing a tamping force to the coffee grounds in the brew chamber 121 to provide a coffee pellet. Applying a tamping force to the coffee grounds compresses the grounds and allows water to permeate evenly through the coffee pellet during brewing. The tamping force may be modified in order to ensure the time the volume of water takes to flow through the coffee grounds is in the range of about 15 to about 35 seconds.

The apparatus 100 may comprise a coffee grounds supply unit 170 configured to supply coffee grounds having a pre-determined particle size. For example, the apparatus may be configured to produce a coffee beverage with a particular terpene content, for example a terpene content of less than about 60 mg/l. In certain embodiments, the coffee grounds supply unit is configured to supply coffee grounds having a surface weighted average particle size of greater than about 20.5 µm to the brewing unit.

In certain embodiments, the apparatus 100 further comprises a coffee grounds selector unit 176 for controlling the particle size of the coffee grounds supplied to the brewing unit 120 from the coffee grounds supply unit 120. In certain embodiments, the coffee grounds selector unit 176 is in communication with a coffee bean grinding unit 174 to control the particle size of coffee grounds produced by the coffee bean grinding unit 174. In certain embodiments, the coffee grounds selector unit 176 is in communication with a coffee bean dosing unit 172 to control the amount of coffee grounds provided to the brewing unit 120 by the coffee beans supply unit 170 based on the pre-determined or selected particle size of the coffee grounds, for example based on the selected particle size of the coffee grounds produced by the coffee bean grinding unit 174.

In certain embodiments, the apparatus 100 comprises a user control 130, for example to allow a user to select a coffee beverage having a desired terpene content. In certain embodiments, a coffee grounds selector unit 176 is coupled to the user control 130, for example for controlling the particle size of coffee grounds supplied to the brewing unit 120 from the coffee grounds supply unit 170 based on the desired terpene content of the coffee beverage selected by the user. The user input may be communicated from the user control to the coffee grounds selector unit via a control board 132.

In certain embodiments, the user control 130 comprises a display unit 136 for displaying information indicative of user inputs to the user control.

In certain embodiments the user control 130 is in communication, optionally via the control board 132, with the water supply unit 140. In certain embodiments, the user control 130, optionally via the control board 132, is in communication with the water supply dosing unit 142, water heater unit 144 and/or the pressurising unit 146 of the water supply unit. The user control may allow a user to vary the temperature, pressure and/or amount of water supplied to the brewing chamber 120. Alternatively, the control board 132 is in communication with the water supply unit 140, and optionally the water supply dosing unit 142, water heater unit 144 and/or the pressurising unit 146 of the water supply unit, and the amount of water, temperature and/or pressure may be controlled by the control board 132, for example based on a particular coffee beverage selected by a user on the user control.

In certain embodiments, the user control 130 comprises a processor for controlling operation of the apparatus, for example, for controlling the terpene level and/or coffee beverage intensity and/or taste of the coffee beverage produced by the apparatus. In certain embodiments, the processor comprises a look up table to select the coffee grounds particle size based on the terpene level selected by the user via the user control. In certain embodiments, the processor comprises a look up table to select the coffee grounds particle size based on the terpene level selected by the user and also to select the amount of coffee grounds supplied to the brewing unit and/or the amount of water supplied to flow through the coffee grounds in the brewing unit, for example based on a coffee beverage taste and/or intensity that may be pre-determined or selected by a user via the user control 130.

Figure 3:
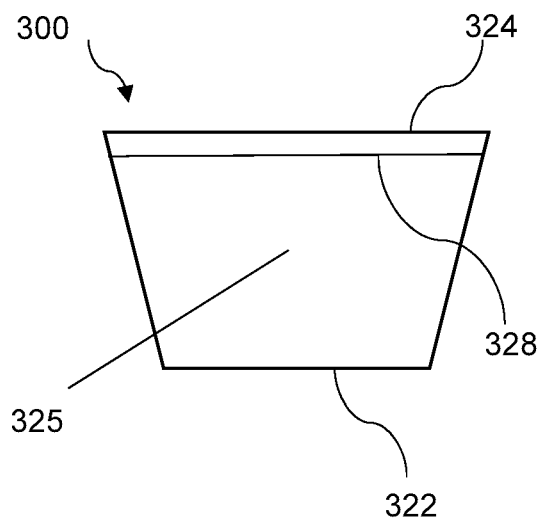
FIG. 3 is a schematic illustration of a capsule according to the present invention.

FIG. 3 is a schematic diagram of a capsule 300 according to the present invention. The capsule 300 is a sealed container containing coffee grounds 325. The capsule comprises a perforatable base 324 and a perforatable top 322. Once inserted into a suitable coffee machine, for example a brewing unit of a suitable coffee machine, a perforation(s) may be made in the perforatable top 322 to form an inlet into which water may flow to reach the coffee grounds 325 and perforations may also be made in the perforatable base 324 so that the coffee beverage produced by water flowing through the coffee grounds in the capsule 300 may exit the capsule. The capsule 300 may comprise a platform 328 on which coffee grounds may be supported during use. The capsule 300 may be considered to be a brew chamber to be placed in a brewing unit as heated and pressurised water may be flowed through the capsule 300 containing coffee grounds 325 to provide a coffee beverage. The particle size of the coffee grounds 325 contained in the capsule 300 may be selected to provide a coffee beverage with a selected terpene content. For example, the coffee grounds 325 may have a surface weighted average particle size of greater than about 20.5 µm, for example to provide a coffee beverage having a terpene content of less than about 60 mg/l, and the capsule 300 may contain an amount of coffee grounds 325 to provide a coffee beverage having a Brix value of greater than about 2%.

Figure 4:
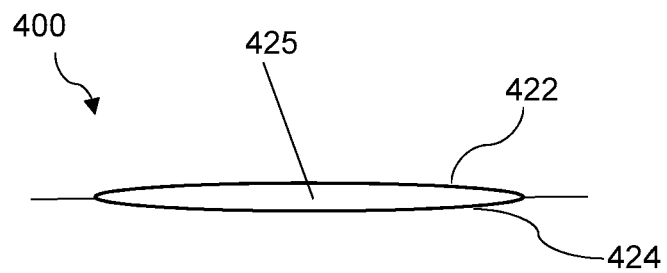
FIG. 4 is a schematic illustration of a pad according to the present invention.

FIG. 4 is a schematic diagram of a pad 400 according to the present invention. The pad 400 is a container containing coffee grounds 425. The pad comprises a top 422 and a base 424 through which water may flow. In certain embodiments, either the top 422 or base 424 may function as the water inlet and either the top 422 or base 424 may function as the water outlet. The pad 400 may be considered to be a brew chamber that may be inserted into a brewing unit of a coffee machine as heated and pressurised water may be flowed through the pad 400 containing coffee grounds 425 to provide a coffee beverage. The particle size of the coffee grounds 425 contained in the pad 400 may be selected to provide a coffee beverage with a selected terpene content. For example, the coffee grounds 425 may have a surface weighted average particle size of greater than about 20.5 µm, for example to provide a coffee beverage having a terpene content of less than about 60 mg/l, and the capsule 400 may contain an amount of coffee grounds 425 to provide a coffee beverage having a Brix value of greater than about 2%.

The present inventors have found that a coffee beverage comprising reduced levels of terpenes, for example cafestol and/or kahweol, may be prepared by increasing the particle size of the coffee grounds. Without wishing to be bound by theory it is considered that the use of a larger particle size reduces shear rate between coffee grounds in the brew chamber as water flows through the brew chamber. It has been found that by maintaining other brewing parameters such as brew time, amount of water, pressure of brewing and temperature of brewing, the quality level of the coffee in terms of taste and/or aroma may be maintained by increasing the amount of coffee grounds used while still providing a coffee beverage having a reduced terpene content compared to coffee brewed using the same brewing parameters and smaller sized particles (even when a smaller amount of the smaller sized particles are used).

EXAMPLES

The inventors investigated the effect of coffee ground particle size on the levels of terpenes contained in coffee beverages.

Example 1

A coffee brewing apparatus comprising a pressurisable brew chamber having a diameter of 42 mm for receiving a volume of heated and pressurised water was used to provide a single shot of espresso. 10 g of Illy® coffee beans were ground in a Cimbali coffee grinder at setting 9 (the surface weighted average particle size of the coffee grounds was determined to be about 30 µm) and provided to the brew chamber and lightly pressed by hand using a stamper to provide a homogeneous coffee grounds layer. Water was heated to 90° C. and 52 ml of heated water was supplied to the brew chamber at a pressure of 4.5 bar and a flow rate of 2.6 ml/s. The brew time for the espresso was 20 seconds (i.e. it took 20 seconds for the water supplied to the brew chamber to flow through the coffee grounds).

Example 2

Example 2 was carried out as per Example 1 except that 10 g of Illy® coffee beans were ground in a Cimbali coffee grinder at setting 5 (the surface weighted average particle size of the coffee grounds was determined to be about 22 µm) were supplied to the brew chamber, and lightly pressed by hand using a stamper to provide a homogeneous coffee grounds layer, and 50 ml of heated water was supplied to the brew chamber at a pressure of 4.5 bar and a flow rate of 2.5 ml/s.

Comparative Example 1

Comparative Example 1 was carried out as per Example 1 except that 10 g of Illy® pre-ground espresso coffee was provided to the brew chamber (the surface weighted average particle size of the coffee grounds was measured to be 19.7 µm), and lightly pressed by hand using a stamper to provide a homogeneous coffee grounds layer, and 51 ml of heated water was supplied to the brew chamber at a pressure of 4.5 bar and a flow rate of 2.55 ml/s.

The Brix value and the cafestol and kahweol content of the espressos produced according to Examples 1 and 2 and Comparative Example 1 were determined as described below.

Determination of Cafestol and Kahweol Content

From each of the espresso produced according to Examples 1 and 2 and Comparative Example 1 three samples were taken from each and analysed for their cafestol and kahweol concentrations.

Each of the coffee beverage samples were dried to form dried extracts and the dried extracts of the coffee samples were reconstituted in 1.0 ml pure methanol (Fisher Scientific, HPLC grade) by mixing them for 10 minutes on a Thermo-mixer. Subsequently, 100 µl of sample solution was transferred to an Agilent PP-insert (used in combination with an Agilent HPLC-vial) and centrifuged to remove undissolved salts. The resulting samples were directly injected (20 µl) into the HPLC system. For the calibration curves, concentration standards of cafestol (Alfa Ceasar, J65355) and kahweol (LKT Laboratories Inc., K0030, >99.5%) were prepared in methanol.

For the HPLC analysis two serially placed Zorbax Eclipse XDB-C18 columns (4.6×150 mm, 5 µm) were used and held at the temperature T=40° C. A water/acetonitrile gradient was used as eluent and the flow rate was set to 1 ml/min. Cafestol and kahweol were optically detected at wavelengths of 225 nm and 290 nm respectively.

The arithmetic mean concentration of cafestol and kahweol in espresso obtained as described in Example 1 and espresso obtained as described in Comparative Example 1 was calculated. The results are presented in FIG. 5.

Determination of Brix Value

A digital hand-held 'pocket' refractometer (Atago® 3830 PAL-3) was used according to the instruction manual to determine the Brix value for each of the coffee beverage samples obtained as described in Examples 1 and 2 and Comparative Example 1. The results are presented in FIG. 5.

Figure 5:
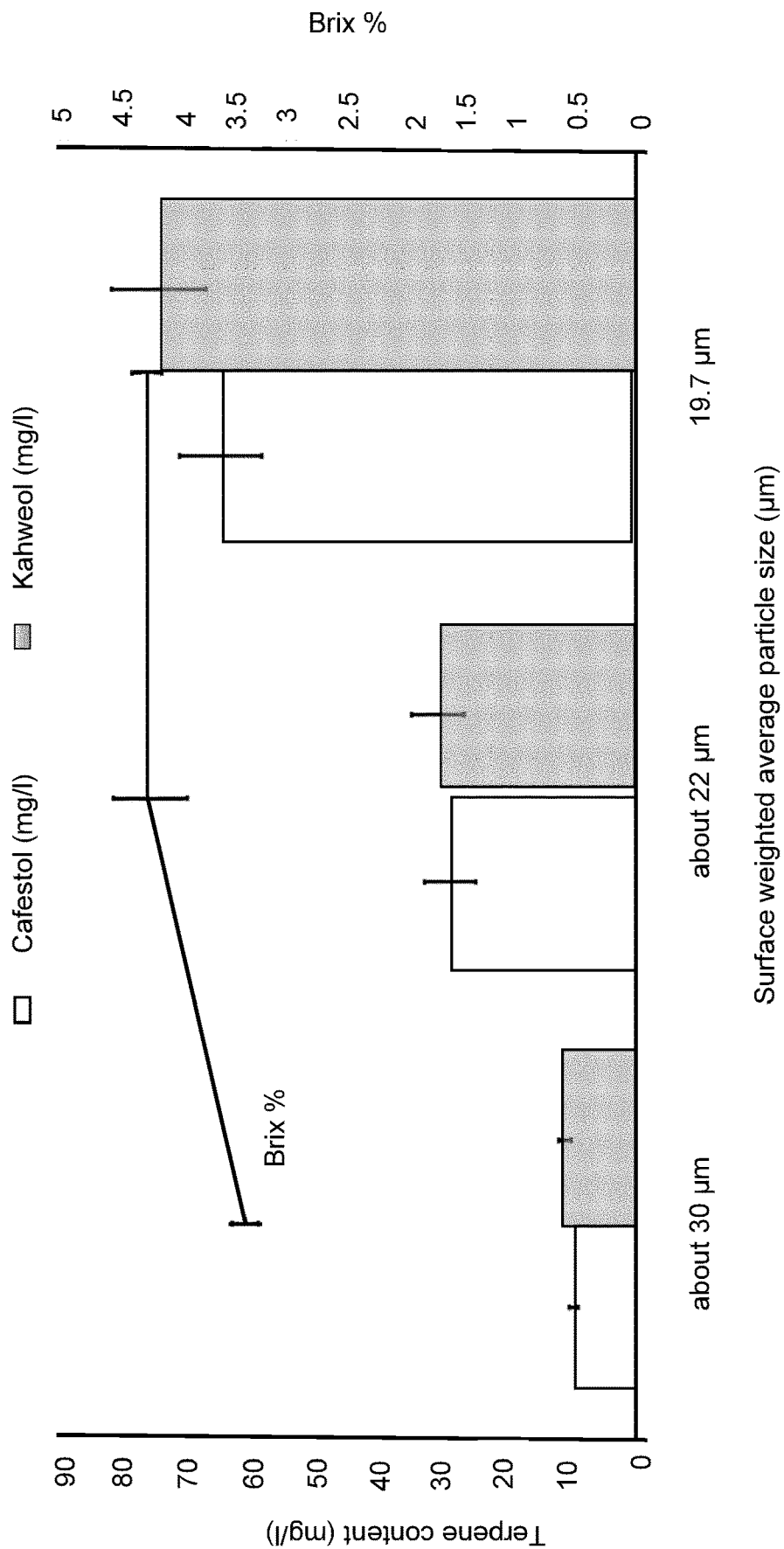
FIG. 5 is graph showing the effect of particle size of coffee grounds on the cafestol and kahweol content and the Brix value of a coffee beverage.

From FIG. 5 it can be seen that increasing the particle size of the coffee grounds reduces the diterpene content of a coffee beverage without substantially affecting the taste or intensity of the coffee beverage (as indicated by the Brix value). The present inventors have found that the Brix value of a coffee beverage can be maintained while still reducing the terpene content by increasing the amount of coffee grounds having the increased particle size.

As discussed above, in order to maintain the quality level of the coffee in terms of taste and/or aroma the use of a coarser grind may be compensated by adding more ground coffee to the brewing unit in accordance with Equation 1 which follows:

$$\left. \begin{array}{c} Vol = \epsilon \cdot \frac{\pi}{6} D^3 \cdot n \to n = \frac{6\,Vol}{\epsilon \cdot \pi D^3} \\ A = n \cdot \pi D^2 \end{array} \right\} A_{tot} = \left\{ \frac{6\,Vol}{\epsilon \cdot \pi D^3} \pi D^2 \right\} = \frac{6\,Vol}{\epsilon \cdot D} \to A_{tot} = \frac{C}{D}$$

where
Vol=volume of ground coffee (before tamping force applied);
$\epsilon$=the stacking efficiency constant for coffee particles;
D=coffee particle diameter;
n=number of coffee particles;
A=surface area of coffee sample;
C is a constant ($6 \cdot Vol/\epsilon$).

From Equation 1, it can be seen that when the grindsize of the particles is doubled then, doubling the volume of coffee maintains a constant extraction surface area.

The present inventors have also found that the brew time can be adjusted by varying the tamping force applied to the coffee grounds in the brew chamber. It has been found that as particle size of the coffee grounds is increased, the tamping force applied to the coffee grounds can be increased to obtain a desired brew time, for example a brew time in the range of 15 to 35 seconds, for example about 25 seconds.

The person skilled in the art realizes that the present invention is by no means limited to the preferred embodiments described above. On the contrary, many modifications and variations are possible within the scope of the appended claims.

Additionally, variations to the disclosed embodiments can be understood and effectuated by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage.

The invention claimed is:

1. A method of providing a coffee beverage having a desired terpene content using a coffee beverage producing apparatus, the method comprising:
   selecting the desired terpene content;
   selecting coffee grounds having a particle size based on the desired terpene content;
   providing the coffee grounds having the selected particle size to a brew chamber; and
   providing a volume of heated and pressurised water to flow through the coffee grounds in the brew chamber and out of the brew chamber to provide the coffee beverage,
   wherein the coffee beverage producing apparatus comprises a user control coupled to a coffee grounds selector unit configured for controlling the particle size of the coffee grounds, and wherein the user control comprises a processor for controlling operation of the coffee beverage producing apparatus.

2. The method according to claim 1, further comprising controlling an amount of the coffee grounds provided to the brew chamber based on the selected particle size of the coffee grounds such that the coffee beverage having a Brix value of greater than about 2% is provided when the volume of heated and pressurised water is flowed through the coffee grounds in the brew chamber.

3. The method according to claim 1, wherein the desired terpene content is a diterpene content of about 60 mg/l or less.

4. The method according to claim 3, wherein the desired terpene content is a cafestol and/or kahweol content of about 60 mg/l or less.

5. The method according to claim 3, wherein the coffee grounds have the selected particle size which is a surface weighted average particle size of about 20.5 μm or greater, optionally about 21 μm or greater, or in a range of about 20.5 μm to about 40 μm.

6. The method according to claim 1, further comprising applying a tamping force to the coffee grounds in the brew chamber such that the volume of heated and pressurised water supplied to the brew chamber takes between 15 seconds and 35 seconds to flow through the coffee grounds in the brew chamber, the applied tamping force being configured dependent on the selected particle size of the coffee grounds, with the applied force being increased as an increased particle size of the coffee ground is selected.

* * * * *